United States Patent [19]
Etoh et al.

[11] Patent Number: 4,557,230
[45] Date of Patent: Dec. 10, 1985

[54] SWIRL CHAMBER FOR INTERNAL COMBUSTION ENGINE

[75] Inventors: Yukihiro Etoh, Yokohama; Toshiaki Tanaka, Chigasaki; Nobukazu Kanesaki, Yokosuka; Hiroaki Miyazaki, Kamakura, all of Japan

[73] Assignee: Nissan Motor Co., Ltd., Japan

[21] Appl. No.: 689,816

[22] Filed: Jan. 8, 1985

Related U.S. Application Data

[63] Continuation-in-part of Ser. No. 534,258, Sep. 21, 1983, abandoned.

[30] Foreign Application Priority Data

Oct. 28, 1982 [JP] Japan .............................. 57-163736[U]

[51] Int. Cl.[4] .............................................. F02B 19/08
[52] U.S. Cl. ................................... 123/263; 123/286; 123/293
[58] Field of Search ............... 123/262, 263, 286, 291, 123/293, 275

[56] References Cited

U.S. PATENT DOCUMENTS 2,979,044 4/1961 Yamada et al. ............... 123/284 X
4,440,125 4/1984 Case .................................. 123/263

FOREIGN PATENT DOCUMENTS 806071 6/1951 Fed. Rep. of Germany .
1017409 10/1957 Fed. Rep. of Germany .
405854 9/1943 Italy ..................... 123/262
138915 10/1979 Japan .
191418 11/1982 Japan ................... 123/262
880503 10/1961 United Kingdom ............... 123/286

*Primary Examiner*—Tony M. Argenbright
*Attorney, Agent, or Firm*—Leydig, Voit & Mayer

[57] ABSTRACT

An interconnecting slot is formed between a main transfer port (heated by the passage of hot gases during an expansion phase) and an auxiliary transfer passage (cooled by the passage of non atomized fuel injected into the swirl chamber with which the main and auxiliary ports are associated) to prevent thermal stress damage which would otherwise be apt to occur.

7 Claims, 8 Drawing Figures

SWIRL CHAMBER FOR INTERNAL COMBUSTION ENGINE

This application is a continuation-in-part of U.S. patent application Ser. No. 534,258 filed on Sept. 21, 1983 in the name of ETOH et al, now abandoned.

BACKGROUND OF THE INVENTION

1. Field of the Invention

The present invention relates generally to a swirl chamber for an internal combustion engine and more specifically to an improved transfer port arrangement therefor.

2. Description of the Prior Art

A previously proposed arrangement shown in FIGS. 1 and 2 of the drawings (disclosed in Prepublished Japanese Patent application No. 51-105509) includes an auxiliary transfer port 1 for transferring a fraction of the fuel injected into the swirl chamber 2 in an unvapourized state into the main combustion chamber 3 for the purposes of improving the fuel distribution between the two chambers and reducing the formation of NOx and the like. However, this arrangement has suffered from the drawback that the unvapourized fuel which passes through the auxiliary port 1 tends to cool the mouth piece 4 of the swirl chamber 2 in the immediate vicinity of the auxiliary transfer port and induces a temperature differential in the zone 5 located between said auxiliary transfer port 1 and a relatively hot main transfer port 6 through which hot combustion gases pass during the expansion phase of the engine. This temperature differential induces sufficient stress in the zone 5 to produce cracks and the like especially along the plane interconnecting the axes of the two ports.

SUMMARY OF THE INVENTION

It is an object of the present invention to provide a port arrangement which obviates the formation of cracks and the like in the swirl chamber as a result of the incorporation of an auxiliary transfer port or ports therein.

In brief, the present invention provides an arrangement wherein an interconnecting slot is formed between a main transfer passage and an auxiliary one cooled by the passage of non-atomized fuel therethrough, to relieve the thermal stress which would otherwise occur.

More specifically, the present invention takes the form of an interal combustion engine having a swirl chamber into which fuel is injected by a fuel injector, a main combustion chamber, and a port arrangement for providing fluid communication therebetween comprising: a main transfer port leading from the main combustion chamber to the swirl chamber and which opens into the swirl chamber in a manner to introduce a fluid charge moving from the main combustion chamber into the swirl chamber in a manner to swirl therein, an auxiliary transfer port leading from the swirl chamber to the main combustion chamber and which is located so that a fraction of the fuel which is injected into the swirl chamber by the fuel injector passes therethrough, and a slot which leads from the main transfer port to the auxiliary transfer port and which fluidly communicates the auxiliary swirl chamber with the main combustion chamber.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
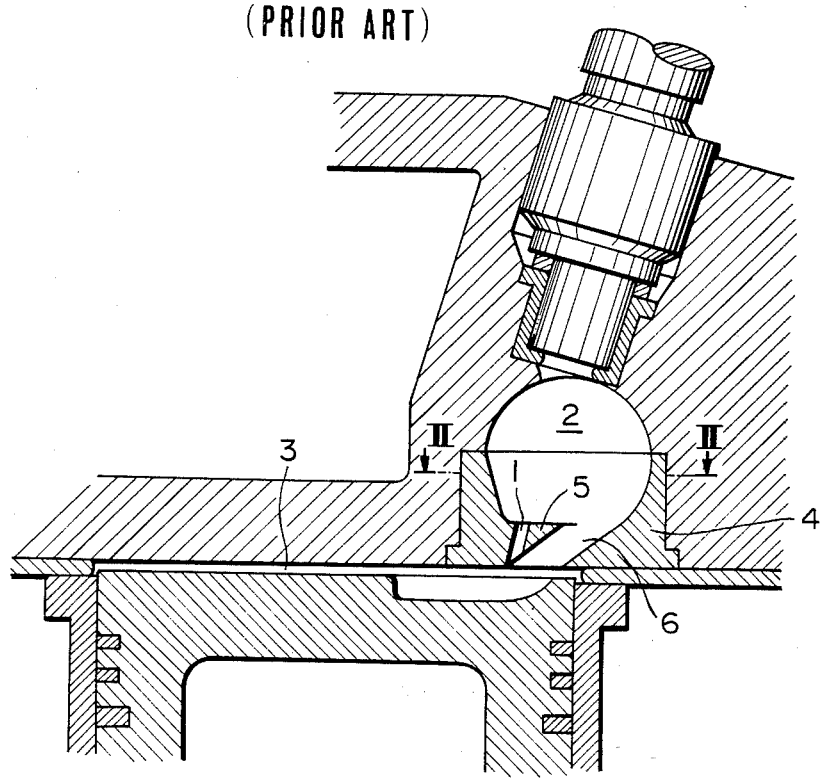
FIG. 1 is a sectional view of the prior art arrangement briefly discused in the opening paragraphs of the present disclosure.
Figure 2:
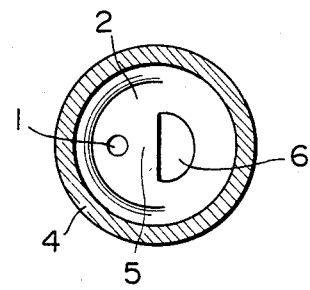
FIG. 2 is a sectional view taken along section line II—II of FIG. 1.
Figure 3:
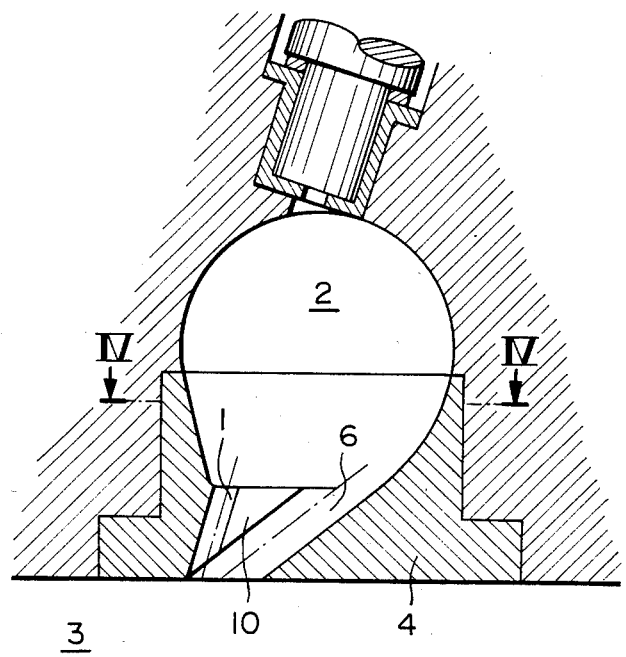
FIG. 3 is a sectional view similar to that of FIG. 1 but showing a first embodiment of the present invention.
Figure 4:
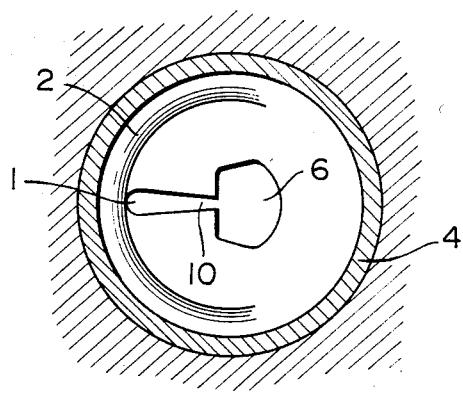
FIG. 4 is a sectional view taken along section lines IV—IV of FIG. 3.
Figure 5:
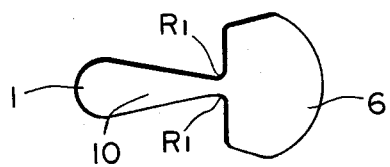
FIG. 5 is an enlarged plan view of the slot arrangement which characterizes the embodiment of the present invention shown in FIGS. 3 and 4.

Turning now to FIGS. 3 and 4 a first embodiment of the present invention is shown. In this arrangement a slot 10 is formed in the swirl chamber mouthpiece 4 in a manner to establish simultaneous fluid communication between the main and auxiliary transfer ports 6, 1 and the main and swirl chambers 3, 2 of the engine. This slot 10 is, as shown, at least in part narrower than the auxiliary transfer port with which it merges. That is to say, is narrower than the auxiliary transfer port in a direction normal to the plane which intersects the axes of the main and auxiliary transfer ports. In this embodiment the slot gradually tapers as it approaches the main transfer port and, as best seen in FIG. 5, is formed with rounded shoulders $R_1$ where it merges with the main transfer port 6. These shoulder may have radii of 0.1 to 0.2 mm. It should be noted that these shoulders obviate the formation of hots spots which tend to form along sharp edges and therefore prevent undesirable fluctuations in ignition timing (viz., disturb the ignition timing due to the spontaneous ingnition characteristics of the fuel within the swirl chamber).

With the above described arrangement, the problem encountered in the prior art is removed in that the zone located between the two ports is provided with an expansion space adequate to relieve the otherwise damaging strain.

Of course it is desirable from the point of maintaining the original function of the main and auxiliary transfer ports 1 and 6, to minimize the width of the slot 10 so as to prevent excessive communication between the two chambers (2,3) while providing the necessary stress relief. Viz., the shape and dimensions of the slot 10 should be selected so as to prevent a flow of air or like charge passing therethrough which can interfere with the swirl produced within the chamber by the charge forced into the chamber through the main transfer port during the compression phase of the engine.

Figure 6:
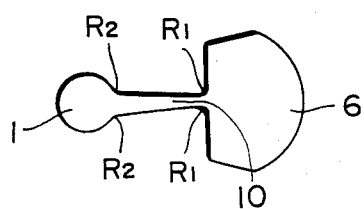
FIGS. 6 to 8 are views similar to that of FIG. 5 which show second, third and fourth embodiments of the present invention.

FIG. 6 shows a second embodiment of the present invention wherein the maximum width of the slot 10 is less than the diameter or width of the auxiliary transfer port 1 taken in the same direction. In this case the shoulders $R_2$ at the intersection of the slot with the auxiliary transfer port, are rounded in a manner similar to that described in connection with the first embodiment.

Figure 7:
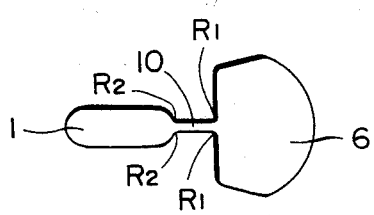

FIG. 7 shows a third embodiment wherein the cross sectional shape of the auxiliary transfer port 1 is arranged to be elongate in the direction of the plane intersecting the axes of the respective ports. In this embodiment the sides of the slot 10 are essentially parallel as different from the first and second embodiments. With this arrangement the increased surface area of the auxiliary transfer port 1 tends to reduce the temperature differential which induces the highly undesirable cracking due to the "spreading" of the cooling effect of the fuel over an increased surface area.

Figure 8:
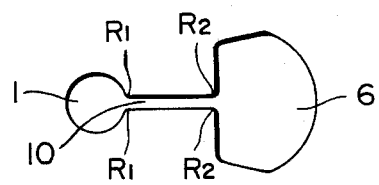

FIG. 8 shows a fourth embodiment of the present invention wherein the slot 10 interconnecting the two transfer ports is straight (viz., has parallel sides) and is formed with rounded shoulders $R_1$, $R_2$ at the points where the slot merges with the respective ports 1 and 6. As mentioned earlier, the provision of the rounded shoulders and the sizing of the main and auxiliary transfer ports and the stress relieving slot is very important. That is to say, the size of the auxiliary port and the slot should be such as to prevent excessive flows of air into the swirl chamber therethrough during the compression phase of the engine while allowing the desired amount of fuel to pass out of the swirl chamber into the main one. Disclosure relating to main and auxiliary port sizing may be found in U.S. patent application Ser. No. 428,227 filed on Sept. 29, 1982 in the name of Toshiaki Tanaka.

The content of the above mentioned reference is incorporated by reference thereto.

Of course it should be appreciated that the present invention may be applied to arrangements wherein the swirl chamber is formed integrally in the cylinder head or the like of the engine, and is not limited to those in which a mouthpiece member is utilized. Further, in the case that multiple auxiliary transfer ports are used, multiple passages may be formed through the sections in which damaging stress is apt to occur.

What is claimed is:

1. In an internal combustion engine having a swirl chamber into which fuel is injected by a fuel injector and a main combustion chamber, a port arrangement for providing fluid communication therebetween comprising:

a main transfer port leading from the main combustion chamber to said swirl chamber and opening into said swirl chamber in a manner to introduce a fluid charge moving from said main combustion chamber into said swirl chamber in a manner to swirl therein;

an auxiliary transfer port leading from said swirl chamber to said main combustion chamber, said auxiliary transfer port having a cross-sectional area which is smaller than that of the transfer port and being located so that a fraction of the fuel injected into said swirl chamber by said fuel injector, passes therethrough; and a slot which leads from said main transfer port to said auxiliary transfer port and which fluidly communicates said auxiliary swirl chamber with said main combustion chamber said slot being at least in part narrower than said auxiliary transfer port and arranged so as to not reduce the swirl generated by the flow of fluid through said main transfer port.

2. A port arrangement as claimed in claim 1, wherein said slot is at least in part narrower than said auxiliary transfer port.

3. A port arrangement as claimed in claim 1, wherein said slot is formed with rounded shoulders where it merges with a transfer port.

4. A port arrangement as claimed in claim 1, wherein said auxiliary transfer port has an elongate cross section in a direction extending from an axis of said auxiliary transfer port toward an axis of said main transfer port.

5. A port arrangement as claimed in claim 1, wherein said slot is tapered as it approaches said main transfer port.

6. A port arrangement as claimed in claim 1, wherein the average width of said slot is less than the width of said auxiliary transfer passage taken in the same direction.

7. A port arrangement as claimed in claim 1, wherein the maximum width of said slot is less than the width of said auxiliary transfer port taken in the same direction.

* * * * *